(12) United States Patent
Stokes

(10) Patent No.: US 6,766,263 B1
(45) Date of Patent: Jul. 20, 2004

(54) METHOD OF COLOR CAPTURE CALIBRATION FOR DIGITAL CAPTURE DEVICES

(75) Inventor: Michael D. Stokes, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/558,529

(22) Filed: Apr. 26, 2000

(51) Int. Cl.[7] .................. G01D 18/00; G01D 21/00; G01M 19/00; G01P 21/00; G01R 35/00
(52) U.S. Cl. .................. 702/88; 382/312; 382/155; 358/504; 386/120; 430/359
(58) Field of Search .................. 702/88; 382/312, 382/155; 358/504; 386/120; 430/359

(56) References Cited

U.S. PATENT DOCUMENTS 5,809,208 A * 9/1998 Komori .................. 386/120
6,274,299 B1 * 8/2001 Buhr et al. .................. 430/359
6,459,825 B1 * 10/2002 Lippincott .................. 382/312

* cited by examiner

Primary Examiner—John Barlow
Assistant Examiner—Aditya Bhat
(74) Attorney, Agent, or Firm—Leydig, Voit & Mayer, Ltd.

(57) ABSTRACT

A system and method for calibration of digital image capture devices is presented that allows the further development of e-commerce by ensuring that the digital image accurately represents the colors of the captured image. This simplified method provides a calibration of the relationship between a digital image capture device output and the human visual perception of the colors input into the device using easily available and affordable test targets, measurement devices, and software with a minimum of labor and expertise. This analysis may be performed using the data analysis tools of a conventional electronic spreadsheet having matrix multiplication and regression capability. Specifically, the method normalizes the test target data to both black and white, and converts the normalized data into the color space of the capture device through white point adaptation. The raw captured image data is also normalized to both black and white, and is regressed with the converted, normalized target data to determine the expected measurement values. These values are used to compensate the device output to achieve a high level of color fidelity. To ensure that the level of fidelity is acceptable, the CIE color difference equations are used.

20 Claims, 6 Drawing Sheets 56  58  60

METHOD OF COLOR CAPTURE CALIBRATION FOR DIGITAL CAPTURE DEVICES

TECHNICAL FIELD

This invention relates generally to the calibration of digital graphic capture devices and, more particularly, to a calibration procedure for digital capture devices based on the human visual system perception of colors to ensure high color fidelity of the captured image.

BACKGROUND OF THE INVENTION

Color calibration of digital image capture devices is important to maintain a high fidelity of the captured image so that a representative image of the item captured may be displayed to a consumer or user of the digital image. This high fidelity becomes more and more important as web-based commerce continues to expand. This may be appreciated as consumers begin to rely more heavily on these images and the accuracy of the colors represented thereon for their purchase decisions. For consumers to continue to expand their usage of web-based commerce, a certain minimum acceptable level of color fidelity quality must be established. Further, this color fidelity must be such that the digital counts output from the capture devices accurately represent the colors as they would appear to a typical human observer. An accurate relationship is necessary to enable reliable digital commerce where users make purchase decisions based upon the trust that the digitally captured image represents the original color appearance of the captured object that is represented in the digital image.

While various methods exist for the calibration of these digital image capture devices, these methods have, to date, required the acquisition of expensive calibration equipment (in the range of $25,000) and the employment of highly trained color scientists. Examples of these calibration procedures may be found in various books and standards, such as Color Management (GATF), Color Management (Giorgianni), the IEC 61966-9 draft specification, and the ISO 17321 draft specification. Calibration facilities and procedures may also be contracted out to specialized laboratories. However, the cost of such calibration services is typically in the range of $20,000 per calibration. As a result, many vendors of these capture devices, especially second and third tier vendors of inexpensive equipment, do not perform this calibration, or perform only a simplified calibration. As a result, many of the images published on the web or used in other media that have been captured by these devices have questionable color fidelity.

SUMMARY OF THE INVENTION

The inventive concepts of the instant invention involve the calibration of digital image capture devices such as digital cameras, scanners, etc. Recognizing the importance of high color fidelity in a competitive commercial environment which will not bear the tremendous expense of prior color calibration methods, the instant invention provides a simple and inexpensive method to ensure a high level of color fidelity that is acceptable for conducting true e-commerce. This method also reduces the error introduced by even the most expensive calibration equipment into the calibration process, and does so with inexpensive and custom color targets. It performs its calibration through the use of a simple regression, such as may be performed by a conventional electronic spreadsheet program, e.g. Excel, etc. Of course, a specialized regression algorithm could be used instead of a conventional spreadsheet, and a multi-linear regression could replace the simple regression, depending on the system requirements. As a result of this method, all digital image capture devices may deliver the high fidelity required in today's e-commerce environment.

Specifically, the method begins by simply acquiring a test target, such as an ANSI IT8, IEC, Q60, MacBeth, etc. color characterization target and its measurement values, including the white point values. This procedure also allows for the use of custom color targets as desired. Preferably, the target provides at least 6 points, although the calibration method achieves acceptable results with as little as 3 color points plus the white and black samples. Higher color fidelity may be achieved by providing more points. This step does not require that the colors be measured in any way, only that the values of the targets be provided in a physical color space, e.g. CIE 1931 XYZ, CIE 1976 LAB, CIECAM, CIELUV, etc. values. This dispenses with the necessity of an expensive spectrometer or spectrophotometer. These values, e.g., of the target are then loaded or entered into a spreadsheet, such as preferably Excel. These entered values are then normalized to a range of 0 to 1 based on the minimum (black) and maximum (white) values.

Next, the value of the light source white point is obtained either through the use of a low cost colorimeter or from the published values of the source. For example, the scanner white point chromaticity values may be obtained from the device vendor. The target white point is then converted to the capture device white point based on simplified CIE Bradford white point adaptation equations. Alternatively, other white point adaptation algorithms known in the art may be used, such as, for example, the full blown Bradford, Von Kries, etc. This will provide the key for the conversion between the target values and those captured from the target. The raw RGB values of the test target are then captured using capture device. It is important that any color management processing, including any gamma correction, of the capture device is disabled during this process. These raw RGB values are then normalized to a range of 0 to 1 based on the minimum (black) and maximum (white) values.

Using the spreadsheet's regression methods (which may be a simple linear regression, or a more complex non-linear, multi-linear, etc. regression) provided by, e.g., Excel's Analysis ToolPak, regress predicted X values based on the normalized X and normalized RGB values without any offset. This results in a 1×3 matrix. This step is repeated for the Y values and the Z values, each time resulting in a 1×3 matrix. These three matrices are then combined into a single 3×3 matrix, from which the computer predicted CIE XYZ values may be obtained. As will be recognized by one skilled in the art, the use of a multi-linear regression can create a single 3×3 matrix in one step instead of the three steps described above. The test target CIE XYZ values in the device white point are used with these predicted CIE XYZ values to compute CIE 1996 color difference values, including average, standard deviation, minimum and maximum delta E*, etc. Based on these values, the predicted accuracy of the capture device is evaluated in the context of its application. Typically an average delta E* of 6 or less is required and 3 or less is desired.

If an acceptable accuracy is achieved, this method then uses the simplified Bradford white point adaptation equations to convert predicted CIE XYZ values from the device white point to D65 (white point of sRGB). As discussed above, the official CIE Bradford equation (including a non-linear aspect for the blue channel) may also be used, or the Von Kries or other algorithms as desired. Next, these values are converted into linear RGB values using the CIE XYZ to RGB matrix from the IEC 61966-2-1 sRGB standard. Finally, these converted values are further converted into sRGB output values using linear to nonlinear tone equations from IEC 61966-2-1 sRGB standard. If an ICC profile is required, the combination of the three 1×3 matrices and a simple tone curve fit of the gray scale data can be used in known fashion. Of course, one skilled in the art will recognize that the output values may be converted to other color spaces as desired. Exemplary additional color spaces, although by no means exhaustive, may be sRGB64, AdobeRGB, etc.

Previous inventions required extensive measurement of the test target to insure the measured white point is identical to the device white point or reworking the device to make the device white point match the published test target white point. Also, most previous inventions ignored normalization of the minimum values or black point and only concentrated on the white point.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
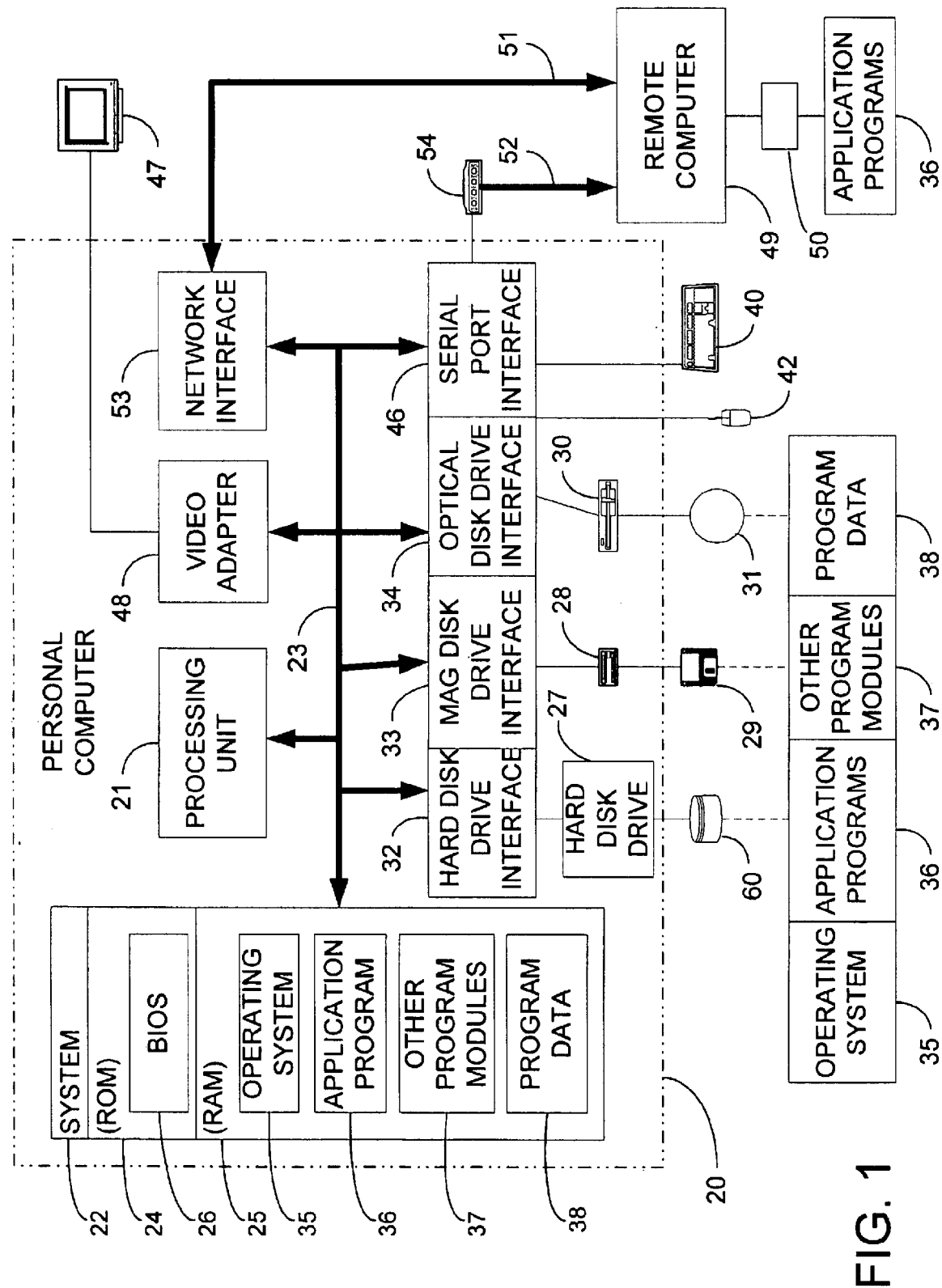
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The necessity of color calibration exists primarily because every machine in a digital image processing system operates within its own color space. As used herein, the term "digital image processing system" may include an end-to-end system of e-commerce, including the digital image capture device, the web server on which the image is hosted, and the personal computer on which the image is viewed by a user. However, the term may also refer to a system as simple as a digital image capture device and a display device. Regardless of the components that make up a digital image processing system, each one processes the captured image in its own color space. For a digital image capture device, which may be, e.g., a scanner or camera, the color space is typically RGB. When the image is displayed on a monitor, RGB still defines the color space, but now it is the RGB color space of the monitor, which most often will differ from that of the camera. If the image is then printed, the image is once again transferred to the color space of the printer, which is most often CMYK.

Figure 2:
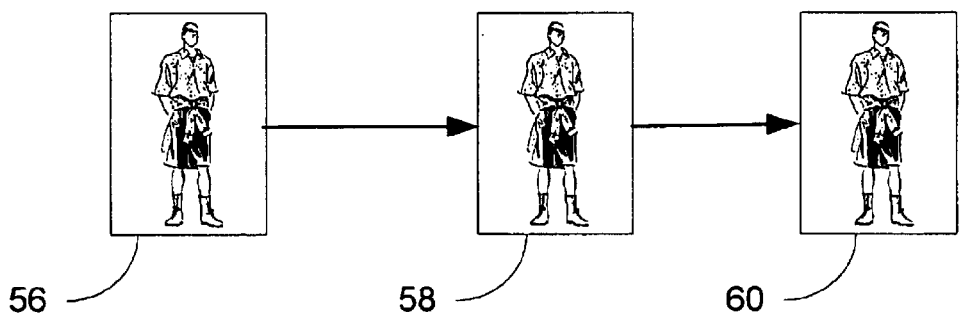
FIG. 2 is a simplified illustration of the translation of a digital image from an input device color space to a device independent communication color space to an output device color space.

Transformations from the color space of one component 56 to that of another 60 is accomplished, most typically, by performing a transformation to a device independent communication color space 58, such as CIELAB, CIELUV, CIECAM, sRGB, etc. as illustrated in FIG. 2. The image in the device independent communication color space 58 is then transformed to the color space of the output device 60 for display or printing. This allows interchangability of components because device-to-device transformations are not necessary. Therefore, each device need only know how to perform transformations to and from its color space 56, 60 from and to the independent communication color space 58.

Figure 3:
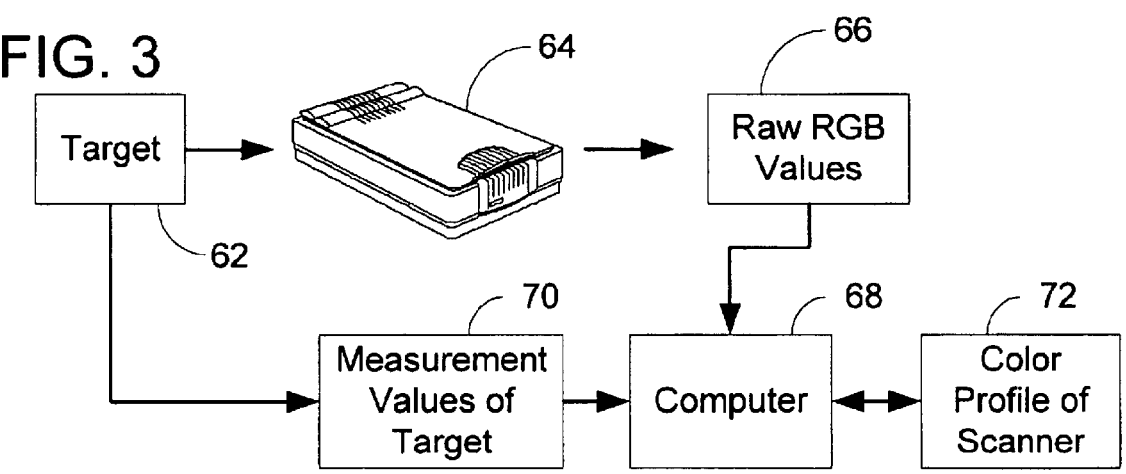
FIG. 3 is a block diagram illustrating a calibration procedure for a digital image capture device.

Calibration is necessary at each component level to maintain the color fidelity of the original object. Specifically, if the image captured by digital image capture device has poor color fidelity, that image will continue to have poor fidelity because the transformations between color spaces at best simply maintains the color fidelity of the image data that is transformed. At a basic level, calibration of a device such as a digital image capture device is performed as illustrated in FIG. 3. A color target 62, such as ANSI IT8, IEC, Q60, MacBeth, ISO equivalent, etc., is scanned or otherwise captured via the capture device to be calibrated, such as scanner 64. The output raw data of the captured target image in the capture device's color space, such as an RGB file 66, is produced and input to a computer 68.

The theoretical or published device independent measurement values of the target 70 are also input to the computer 68. The computer 68 performs a comparison of the measured values for the target 66 and the actual or theoretical values 70. The deviations between actual and theoretical values provide exact information on the color space and character of the capture device 64 from which the color profile 72 of the device 64 is determined. This color profile 72 may then be used by the capture device 64 to "adjust" its raw output data to obtain a high color fidelity of the images that it captures.

While this general method of color calibration is well known, the particular algorithms used by the computer 68 in generating the color profile may differ significantly in terms of both complexity and processing time. Additionally, the requirements for the targets 62 for these algorithms differ significantly and may significantly impact the cost of the calibration. The calibration method of the instant invention allows for simple calculations that may be performed on an electronic spreadsheet, and the use of inexpensive and even custom targets. It does so by taking advantage of a priori knowledge of the capture device white point, the assumed target white point, and recent knowledge of how humans perceive scaling white and black. With this, the method of the instant invention implements a relatively simple procedure that yields highly accurate results. While it does not account for different white points or a variety of other viewing condition factors, it does address the "80%" solution that is needed by the mass market. In fact, most product capture workflows use well known white points that fit well into the method of the instant invention. This fact is ignored by most academic solutions currently being proposed to calibration capture devices in their quest for a perfect solution.

As indicated above, the calibration procedure of the instant invention preferably utilizes a physically based color space to ensure that the digital values accurately represent the colors as they would appear to a typical human observer. One such system applicable to the instant method, although by no means the only color system, is the CIE 1931 XYZ color space defined by the Commission Internationale de l'Eclairage. This color standard is based on imaginary primary colors XYZ, which do not exist physically. They are purely theoretical and independent of device-dependent color gamuts such as RGB or CYMK. These virtual primary colors have, however, been selected so that all colors that can be perceived by the human eye lie within their color space. This relates to the tristimulus theory of color perception, that states that the human retina has three kinds of cones with peak sensitivities to 580 nm ("red"), 545 nm ("green"), and 440 nm ("blue:). These primaries are combined in an additive manner, an advantage over other color models (such as RGB) where negative weights may be needed to specify some colors. Since one person's eye may vary from another person's, CIE defines a standard observer whose spectral response corresponds to the average response of the population. This makes the colorimetric determination of colors much more objective.

The three primary colors of the CIE 1931 XYZ system are based on a spatial model with coordinates X, Y, and Z. These three coordinates form a three-dimensional chromaticity triangle that is most often represented as a two-dimensional diagram projected into the red-green plane (X-Y plane). Since this two-dimensional diagram does not represent the Z coordinate, a standardization is performed so that it may be read nonetheless. This standardization defines chromaticity coordinates x, y, and z (lower case) defined as:

$$x = \frac{X}{(X+Y+Z)}$$

$$y = \frac{Y}{(X+Y+Z)}$$

$$z = \frac{Z}{(X+Y+Z)}$$

where: $x + y + z = 1$ therefore: $z = 1 - x - y$

As may be seen from these equations, the value of z of any desired color can be obtained by subtracting the chromaticity coordinates x and y from 1.

The chromaticity values of x and y do not fully define a color without a brightness component. In the CIE XYZ system, the eye response curves are standardized so that they simultaneously reflect the sensation of brightness. Therefore, a color is only fully described in full using its chromaticity components x and y if a brightness component Y is also specified. In the standard color triangle, the right-angled chromaticity triangle drawn from zero, x=1, and y=1 represents the boundaries of this reference system. Chromaticities cannot lie outside the triangle. The closed curve section of the CIE XYZ two-dimensional projection represents the position of the spectral colors. The primary colors RGB of a typical capture device form a triangle within the spectral color gamut having a smaller color gamut with the achromatic point approximately at its center.

Turning now to an embodiment of the calibration procedure and method of the instant invention, as illustrated in FIG. 4, the calibration is begun 100 by acquiring a test target 102 such as those described above, or a customized target. While more expensive targets provide many color patches, targets providing at least 50 to 70 patches are preferred, although inexpensive targets having as few as 24 patches provide very good results. Further, the method of the instant invention provides acceptable results utilizing targets with as few as 6 patches, such as a white, a black, a gray, and three primaries, either a red, a green, and a blue, or a cyan, a magenta, and a yellow. Actually, any three orthogonal colors are acceptable for the instant invention along with the necessary white and black samples. Further, the gray patch need not be in the middle, but can range anywhere from approximately 25% to 75% gray. This step assumes that the spectral makeup of the target is representative of the type of material of the objects whose digital images will be captured. For example, while a photographic target will work reasonably well if the objects are textiles, the calibration may not yield completely accurate results.

The test target measurement values are then determined 104, as is the capture devices' white point chromaticity 106. While the method of the instant invention may use values in any physical color space, the following description of an exemplary embodiment of the method of the instant invention will utilize the CIE XYZ color space for simplicity. However, this in no way limits the scope of the invention to that particular color system. Unlike many prior calibration procedures that require highly accurate and expensive equipment, these values may be obtained from the manufacturer. If the white point of the capture device is not known, a low cost calorimeter may be used to measure this. Further, the white point of the capture device may be extracted from the measured white point of the target. The test target measurement values are then normalized 108 to a range of 0–1 for the Q60 white point. Advantageously, the method of the instant invention normalizes to both the black (0) and the white (1). This normalization is performed in accordance with the following equations:

$$X_{norm-Q60} = X_{Q60}\left(\frac{X_{target} - X_{target-min}}{X_{target-max} - X_{target-min}}\right)$$

$$Y_{norm-Q60} = Y_{Q60}\left(\frac{Y_{target} - Y_{target-min}}{Y_{target-max} - Y_{target-min}}\right)$$

$$Z_{norm-Q60} = Z_{Q60}\left(\frac{Z_{target} - Z_{target-min}}{Z_{target-max} - Z_{target-min}}\right)$$

Once the test target measurement values have been normalized for the Q60 white point, they then are brought into the capture device's color space 110. This is unique to the method of the instant invention. Typical methods require that the white point of the capture device be an "approved" white point. Unlike these prior methods, the instant invention works for any white point that exists for the capture device. This allows less expensive devices to be used in the capture device while still providing acceptable output and high color fidelity. Even if the capture device used a yellow light source, the images output from the device after translation will have a high fidelity to the original image or object. These values are transformed to the devices color space by converting to its white point 110 through the simplified Bradford white point adaptation equations as follows:

$$\begin{bmatrix} 3 \times 3\,Translation \\ Matrix\,Q60Wht.Pt. \\ ToCameraWht.Pt. \end{bmatrix} =$$

$$\left(\begin{bmatrix} 3 \times 3 \\ Bradford \\ Reverse \\ Matrix \end{bmatrix} \begin{bmatrix} \frac{R_{wpt-cam}}{R_{wpt-target}} & 0 & 0 \\ 0 & \frac{G_{wpt-cam}}{G_{wpt-target}} & 0 \\ 0 & 0 & \frac{B_{wpt-cam}}{B_{wpt-target}} \end{bmatrix} \begin{bmatrix} 3 \times 3 \\ Bradford \\ Forward \\ Matrix \end{bmatrix}\right)$$

$$\begin{bmatrix} X_{norm-cam} \\ Y_{norm-cam} \\ Z_{norm-cam} \end{bmatrix} = \begin{bmatrix} 3 \times 3\,Translation \\ Matrix\,Q60Wht.Pt. \\ ToCameraWht.Pt. \end{bmatrix} \begin{bmatrix} X_{norm-Q60} \\ Y_{norm-Q60} \\ Z_{norm-Q60} \end{bmatrix}$$

As discussed above, the full CIE Bradford algorithm, or others such as, for example, the Von Kries or a number of others may be used as desired.

The images from the test target are captured 112 by the digital capture device to produce raw RGB values for the target. It is important to disable any gamma correction before the raw RGB values are captured. This step assumes a value of approximately 1.0 for gamma. These raw RGB values for the test target are then normalized 114 to a range of 0–1 so that a proper comparison with the normalized measurement values form the target may be accomplished. This normalization is accomplished through the following equations:

$$R_{raw\text{-}norm} = \frac{R_{raw} - R_{raw\text{-}min}}{R_{raw\text{-}min} - R_{raw\text{-}max}}$$

$$G_{raw\text{-}norm} = \frac{G_{raw} - G_{raw\text{-}min}}{G_{raw\text{-}min} - G_{raw\text{-}max}}$$

$$B_{raw\text{-}norm} = \frac{B_{raw} - B_{raw\text{-}min}}{B_{raw\text{-}min} - B_{raw\text{-}max}}$$

Regression analysis 116 is then performed on the normalized test target measurement values and the normalized RGB values to determine the expected measurement values. Essentially, this step 116 is predicting the best fit to convert the RGB values to what the predicted XYZ values should be. The data analysis capabilities of an electronic spreadsheet, such as Microsoft's Excel spreadsheet, may be utilized to perform this regression. Specifically, utilizing Excel's Analysis ToolPak's regression analysis, this analysis may be performed by individually selecting the test target measurement values normalized to the capture device's color space $X_{norm\text{-}cam}$, $Y_{norm\text{-}cam}$, and $Z_{norm\text{-}cam}$ as the input y range, i.e. the range of dependent data. The matrix of normalized raw RGB values is selected as the input x range, i.e. the range of independent data. Preferably, the y-intercept is selected to be zero. The result of these three regressions is a 3×3 matrix of the expected measurement values in the color space of the capture device. Alternatively, a single multi-linear regression may be performed to achieve the 3×3 matrix as will be recognized by one skilled in the art.

This matrix of regressed values is then multiplied 118 by the matrix of normalized raw RGB values to determine the predicted measurement values of the test target in the color space of the capture device as follows:

$$\begin{bmatrix} X_{pred\text{-}meas} \\ Y_{pred\text{-}meas} \\ Z_{pred\text{-}meas} \end{bmatrix} = \begin{bmatrix} R_{regressX} & G_{regressX} & B_{regressX} \\ R_{regressY} & G_{regressY} & B_{regressY} \\ R_{regressZ} & G_{regressZ} & B_{regressZ} \end{bmatrix} \begin{bmatrix} R_{raw\text{-}norm} \\ G_{raw\text{-}norm} \\ B_{raw\text{-}norm} \end{bmatrix}$$

Having now obtained the normalized test target measurement values, and calculated the predicted measurement values based on the raw RGB values from the capture device, CIE 1996 color difference values are calculated to determine how good of a calibration has been yielded. Since the CIE color difference calculations are performed in either CIEL*u*v* or CIEL*a*b*, conversion to one of these color spaces is necessary. In the exemplary embodiment illustrated in FIG. 4, the CIEL*u*v* is chosen. These calculations include the calculations 120, 122, 124, 126, and 128 for the normalized test target measurement values in the capture device's color space, and calculations 130, 132, 134, 136, and 138 for the predicted measurement values. The equations governing the calculations 120 are as follows:

If $\dfrac{X_{norm\text{-}cam}}{X_{whitepoint\text{-}cam}} \leq 0.008856$

Then $f\left(\dfrac{X_{norm\text{-}cam}}{X_{whitepoint\text{-}cam}}\right) = 7.787\left(\dfrac{X_{norm\text{-}cam}}{X_{whitepoint\text{-}cam}}\right) + \dfrac{16}{116}$, Else $f\left(\dfrac{X_{norm\text{-}cam}}{X_{whitepoint\text{-}cam}}\right) = \left(\dfrac{X_{norm\text{-}cam}}{X_{whitepoint\text{-}cam}}\right)^{1/3}$ If $\dfrac{Y_{norm\text{-}cam}}{Y_{whitepoint\text{-}cam}} \leq 0.008856$ Then $f\left(\dfrac{Y_{norm\text{-}cam}}{Y_{whitepoint\text{-}cam}}\right) = 7.787\left(\dfrac{Y_{norm\text{-}cam}}{Y_{whitepoint\text{-}cam}}\right) + \dfrac{16}{116}$, Else $f\left(\dfrac{Y_{norm\text{-}cam}}{Y_{whitepoint\text{-}cam}}\right) = \left(\dfrac{Y_{norm\text{-}cam}}{Y_{whitepoint\text{-}cam}}\right)^{1/3}$ If $\dfrac{Z_{norm\text{-}cam}}{Z_{whitepoint\text{-}cam}} \leq 0.008856$ Then $f\left(\dfrac{Z_{norm\text{-}cam}}{Z_{whitepoint\text{-}cam}}\right) = 7.787\left(\dfrac{Z_{norm\text{-}cam}}{Z_{whitepoint\text{-}cam}}\right) + \dfrac{16}{116}$, Else $f\left(\dfrac{Z_{norm\text{-}cam}}{Z_{whitepoint\text{-}cam}}\right) = \left(\dfrac{Z_{norm\text{-}cam}}{Z_{whitepoint\text{-}cam}}\right)^{1/3}$ The equation for meas L* 122 for the normalized test target measurement values is as follows:

If $Y_{norm\text{-}cam} \leq 0.008856$

Then $measL^*_{norm\text{-}cam} = 100(9.033 Y_{norm\text{-}cam})$

Else $measL^*_{norm\text{-}cam} = 100(1.16(Y_{norm\text{-}cam})^{1/3} - 0.16)$

The equation for meas a* 124 for the normalized test target measurement values is as follows:

$$measa^*_{norm\text{-}cam} = 500\left(f\left(\dfrac{X_{norm\text{-}cam}}{X_{whitepoint\text{-}cam}}\right) - f\left(\dfrac{Y_{norm\text{-}cam}}{Y_{whitepoint\text{-}cam}}\right)\right)$$

The equation for meas b* 126 for the normalized test target measurement values is as follows:

$$measb^*_{norm\text{-}cam} = 200\left(f\left(\dfrac{Y_{norm\text{-}cam}}{Y_{whitepoint\text{-}cam}}\right) - f\left(\dfrac{Z_{norm\text{-}cam}}{Z_{whitepoint\text{-}cam}}\right)\right)$$

The equation for meas C* 128 for the normalized test target measurement values is as follows:

$$measC^*_{norm\text{-}cam} = \sqrt{(measa^*_{norm\text{-}cam})^2 + (measb^*_{norm\text{-}cam})^2}$$

These calculations are also performed, as stated above, for the predicted measurement values. For calculation 130, the following equations are used:

If $\dfrac{X_{pred\text{-}meas}}{X_{whitepoint\text{-}cam}} \leq 0.008856$

-continued

Then $f\left(\dfrac{X_{pred\text{-}meas}}{X_{whitepoint\text{-}cam}}\right) = 7.787\left(\dfrac{X_{pred\text{-}meas}}{X_{whitepoint\text{-}cam}}\right)$ Else $f\left(\dfrac{X_{pred\text{-}meas}}{X_{whitepoint\text{-}cam}}\right) = \left(\dfrac{X_{pred\text{-}meas}}{X_{whitepoint\text{-}cam}}\right)^{1/3}$ If $\dfrac{Y_{pred\text{-}meas}}{Y_{whitepoint\text{-}cam}} \le 0.008856$ Then $f\left(\dfrac{Y_{pred\text{-}meas}}{Y_{whitepoint\text{-}cam}}\right) = 7.787\left(\dfrac{Y_{pred\text{-}meas}}{Y_{whitepoint\text{-}cam}}\right)$ Else $f\left(\dfrac{Y_{pred\text{-}meas}}{Y_{whitepoint\text{-}cam}}\right) = \left(\dfrac{Y_{pred\text{-}meas}}{Y_{whitepoint\text{-}cam}}\right)^{1/3}$ If $\dfrac{Z_{pred\text{-}meas}}{Z_{whitepoint\text{-}cam}} \le 0.008856$ Then $f\left(\dfrac{Z_{pred\text{-}meas}}{Z_{whitepoint\text{-}cam}}\right) = 7.787\left(\dfrac{Z_{pred\text{-}meas}}{Z_{whitepoint\text{-}cam}}\right)$ Else $f\left(\dfrac{Z_{pred\text{-}meas}}{Z_{whitepoint\text{-}cam}}\right) = \left(\dfrac{Z_{pred\text{-}meas}}{Z_{whitepoint\text{-}cam}}\right)^{1/3}$ The equation for meas L* 132 for the predicted measurement values is as follows:

If $Y_{pred\text{-}meas} \le 0.008856$

Then $measL^*_{pred\text{-}meas} = 100(9.033 Y_{pred\text{-}meas})$

Else $measL^*_{pred\text{-}meas} = 100(1.16(Y_{pred\text{-}meas})^{1/3} - 0.16)$ The equation for meas a* 134 for the predicted measurement values is as follows:

$measa^*_{pred\text{-}meas} = 500\left(f\left(\dfrac{X_{pred\text{-}meas}}{X_{whitepoint\text{-}cam}}\right) - f\left(\dfrac{Y_{pred\text{-}meas}}{Y_{whitepoint\text{-}cam}}\right)\right)$ The equation for meas b* 136 for the predicted measurement values is as follows:

$measb^*_{pred\text{-}meas} = 200\left(f\left(\dfrac{X_{pred\text{-}meas}}{X_{whitepoint\text{-}cam}}\right) - f\left(\dfrac{Z_{pred\text{-}meas}}{Z_{whitepoint\text{-}cam}}\right)\right)$ The equation for meas C* 138 for the predicted measurement values is as follows:

$measC^*_{pred\text{-}meas} = \sqrt{(measa^*_{pred\text{-}meas})^2 + (measb^*_{pred\text{-}meas})^2}$ Once these values have been calculated, the differences between these two sets are calculated. Specifically, calculation 140 utilizes the following equation:

$\Delta L^* = \text{meas } L^*_{pred\text{-}meas} - \text{meas } L^*_{norm\text{-}cam}$ The equation to calculate delta a* 142 is as follows:

$\Delta a^* = \text{meas } a^*_{pred\text{-}meas} - \text{meas } a^*_{norm\text{-}cam}$ The equation to calculate delta b* 144 is as follows:

$\Delta b^* = \text{meas } b^*_{pred\text{-}meas} - \text{meas } b^*_{norm\text{-}cam}$ The equation to calculate delta C* 146 is as follows:

$\Delta C^* = \text{meas } C^*_{pred\text{-}meas} - \text{meas } C^*_{norm\text{-}cam}$ The CIE color difference equation is then used to calculate delta E* is as follows:

$\Delta E^* = \sqrt{\Delta L^{*2} + \Delta a^{*2} + \Delta b^{*2}}$

The equation to calculate delta H* 150 is as follows:

If $\Delta E^{*2} - \Delta L^{*2} - \Delta C^{*2} < 0$

Then $\Delta H^{*2} = 0$

Else $\Delta H^* = \sqrt{\Delta E^{*2} - \Delta L^{*2} - \Delta C^{*2}}$

With these factors now calculated, the CIE 1996 compensation factors may be ed as indicated at calculation blocks 152, 154, and 156 with the following equations:

$L_{comp} = \Delta L^*$ $C_{comp} = \dfrac{\Delta C^*}{1 + (0.045 \cdot |measC^*|)}$ $H_{comp} = \dfrac{\Delta H^*}{1 + (0.015 \cdot |measC^*|)}$ From these factors, calculation block 158 may be performed using the following equation:

$\Delta E^* CIE94 = \sqrt{L^2_{comp} + C^3_{comp} + H^2_{comp}}$

Once calculation 158 has been performed, its result is checked 160 to determine if the predicted accuracy is acceptable. Typically, this value is required to be 6 or less, and a value of 3 or less desired. If the accuracy is not sufficient, an error is logged 162. This may be due to the capture device having gamma compensation turned on or some other compensation that cannot be turned off. As stated above, the gamma is assumed to be approximately 1.0. If this is not the case, a simple tone compensation based on the estimate of the actual gamma may be accomplished to estimate what the right count actually is. The estimation of gamma in this case may be accomplished in a known manner with as little as three points. If at least 7 points are known, a spline fit may be accomplished. If the predicted accuracy is achieved, the predicted measurement values are converted 164 using the simplified Bradford white point adaptation equations from the capture device's white point or color space, to the D65 white point. As discussed above, the full CIE Bradford algorithm, as well as others, may also be used as desired. In the exemplary embodiment, however, the conversion is as follows:

$\begin{bmatrix} 3 \times 3 \, Translation \\ Matrix Camera \\ To D65 Wht.Pt. \end{bmatrix} =$ $$\left(\begin{bmatrix} 3\times 3 \\ Bradford \\ Reverse \\ Matrix \end{bmatrix} \begin{bmatrix} \dfrac{R_{wpt\text{-}D65}}{R_{wpt\text{-}cam}} & 0 & 0 \\ 0 & \dfrac{G_{wpt\text{-}D65}}{G_{wpt\text{-}cam}} & 0 \\ 0 & 0 & \dfrac{B_{wpt\text{-}D65}}{B_{wpt\text{-}cam}} \end{bmatrix} \begin{bmatrix} 3\times 3 \\ Bradford \\ Forward \\ Matrix \end{bmatrix}\right)$$

$$\begin{bmatrix} X_{D65} \\ Y_{D65} \\ Z_{D65} \end{bmatrix} = \begin{bmatrix} 3\times 3\,Translation \\ MatrixCamera \\ ToD65Wht.Pt. \end{bmatrix} \begin{bmatrix} X_{pred\text{-}meas} \\ Y_{pred\text{-}meas} \\ Z_{pred\text{-}meas} \end{bmatrix}$$

If any $X_{D65}$, $Y_{D65}$, or $Z_{D65} < 0$

Then $X_{D65}$, $Y_{D65}$, or $Z_{D65} = 0$

These values are then further converted 166 using the CIE XYZ to RGB matrix from the IEC 61966-2-1 sRGB Standard from D65 to linear RGB values as follows:

$$\begin{bmatrix} R' \\ G' \\ B' \end{bmatrix} = \begin{bmatrix} 3\times 3\,Translation \\ MatrixD65To \\ LinearRGB \end{bmatrix} \begin{bmatrix} X_{D65} \\ Y_{D65} \\ Z_{D65} \end{bmatrix},$$

where $\begin{bmatrix} 3\times 3\,Translation \\ MatrixD65To \\ LinearRGB \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix}$ Finally, these linear RGB values are converted 168 in accordance with the nonlinear tone equations from IEC 61966-2-1 to sRGB output values in the exemplary embodiment. As discussed above, however, other RGB color spaces may be output by the appropriate conversion, such as sRGB64, AdobeRGB, etc. as desired. This sRGB is a standard, device independent color space used on the Internet and in television. This final transformation allows the digital capture device to output calibrated values that may be directly transmitted over the Internet. These values are calculated as follows:

If R' < 0,
 Then $R_{sRGB}$ = 0,
 Else If R' < 0.00304,
  Then $R_{sRGB}$ = (12.92R') · 255,
  Else If R' > 1,
   Then $R_{sRGB}$ = 255,
   Else $R_{sRGB}$ = 255(1.055R'$^{1/2.4}$ −0.055)
If G' < 0,
Then $G_{sRGB}$ = 0,
 Else If G' < 0.00304,
  Then $G_{sRGB}$ = (12.92G') · 255,
  Else If G' > 1,
   Then $G_{sRGB}$ = 255,
   Else $G_{sRGB}$ = 255(1.055G'$^{1/2.4}$ −0.055)
If B' < 0,
Then $B_{sRGB}$ = 0,
 Else If B' < 0.00304,
  Then $B_{sRGB}$ = (12.92B') · 255,
  Else If B' > 1,
   Then $B_{sRGB}$ = 255,
   Else $B_{sRGB}$ = 255(1.055B'$^{1/2.4}$ −0.055)

As is now apparent, this method performs two white point conversions. The first is from the test target space to the device space. The device space is where all of the processing is accomplished, unlike prior methods. Once this processing has been completed, a second transformation from the device space to a device independent communication space, such as sRGB, sRGB64, AdobeRGB, etc., is performed to allow the digital image to be communicated to other devices in a known space.

Once the above calibration has been performed and the color fidelity has been verified to be acceptable, a single 3×3 compensation matrix may be developed as follows:

$$\begin{bmatrix} 3\times 3\,Translation \\ MatrixD65To \\ LinearRGB \end{bmatrix} \left(\begin{bmatrix} 3\times 3\,Translation \\ MatrixCamera \\ ToD65Wht.Pt. \end{bmatrix} \begin{bmatrix} R_{regressX} & G_{regressX} & B_{regressX} \\ R_{regressY} & G_{regressY} & B_{regressY} \\ R_{regressZ} & G_{regressZ} & B_{regressZ} \end{bmatrix}\right) = \begin{bmatrix} 3\times 3 \\ Compensation \\ Matrix \end{bmatrix}$$

Figure 5:
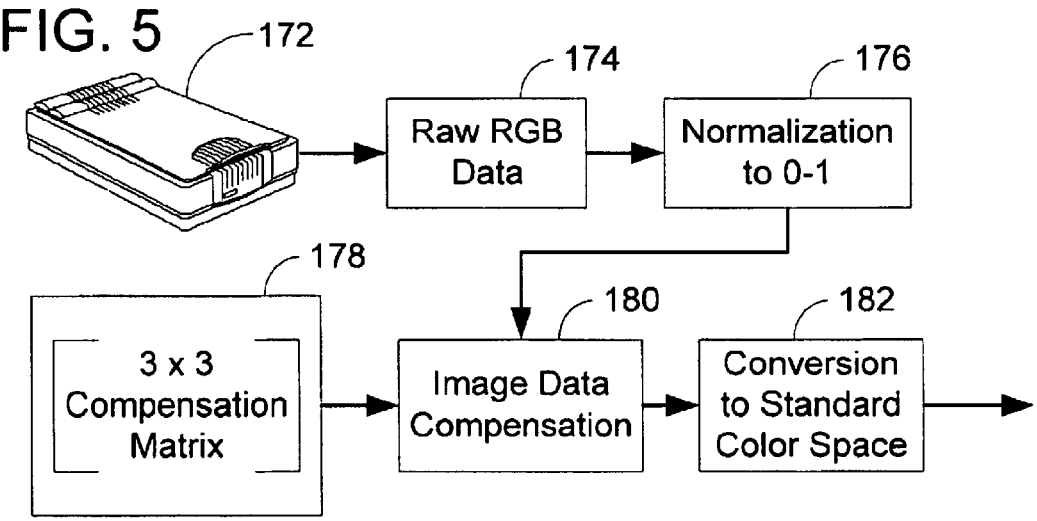
FIG. 5 is a block diagrammatic illustration of a digital image capture device having image data compensation and conversion in accordance with the instant invention.
Figure 4A:
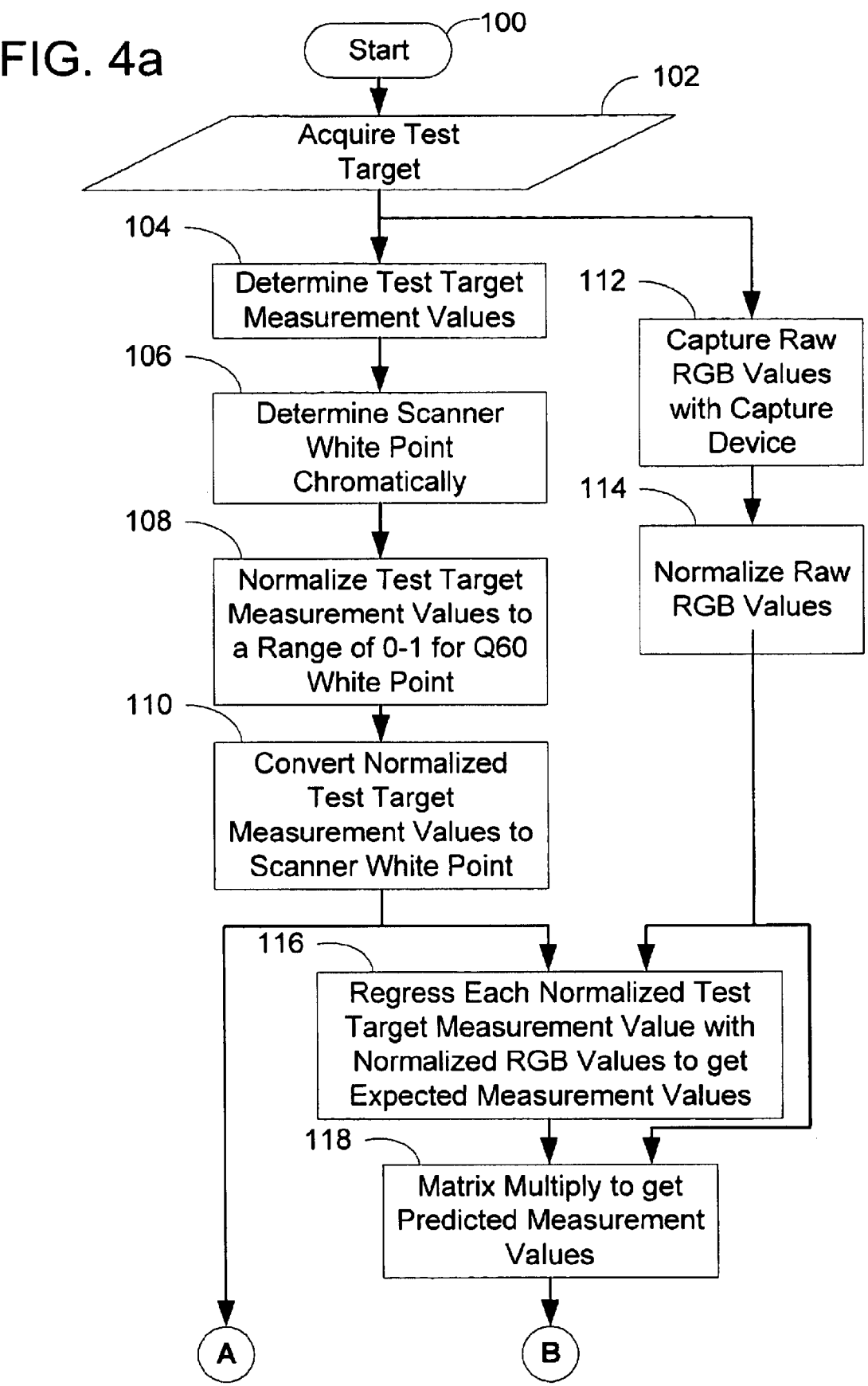
FIGS. 4a–d illustrate a process flow diagram illustrating an embodiment of the method of the instant invention.
Figure 4B:
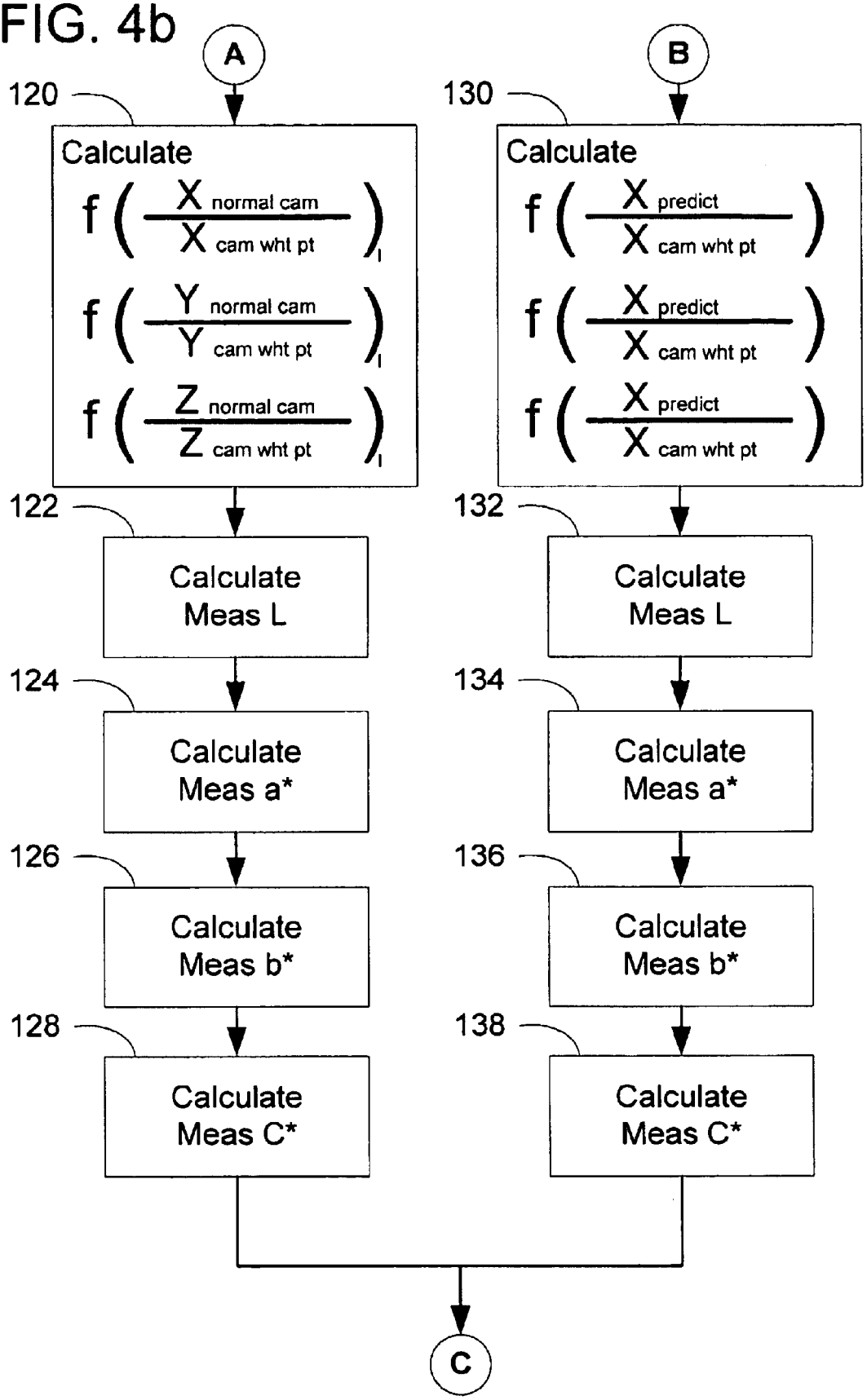
Figure 4C:
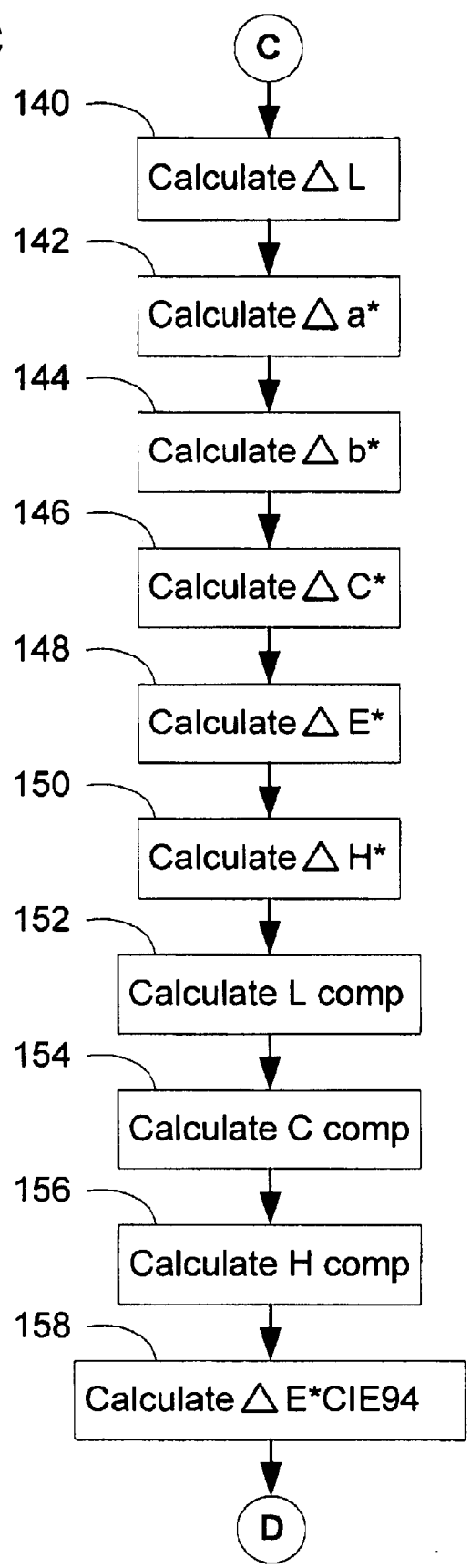
Figure 4D:
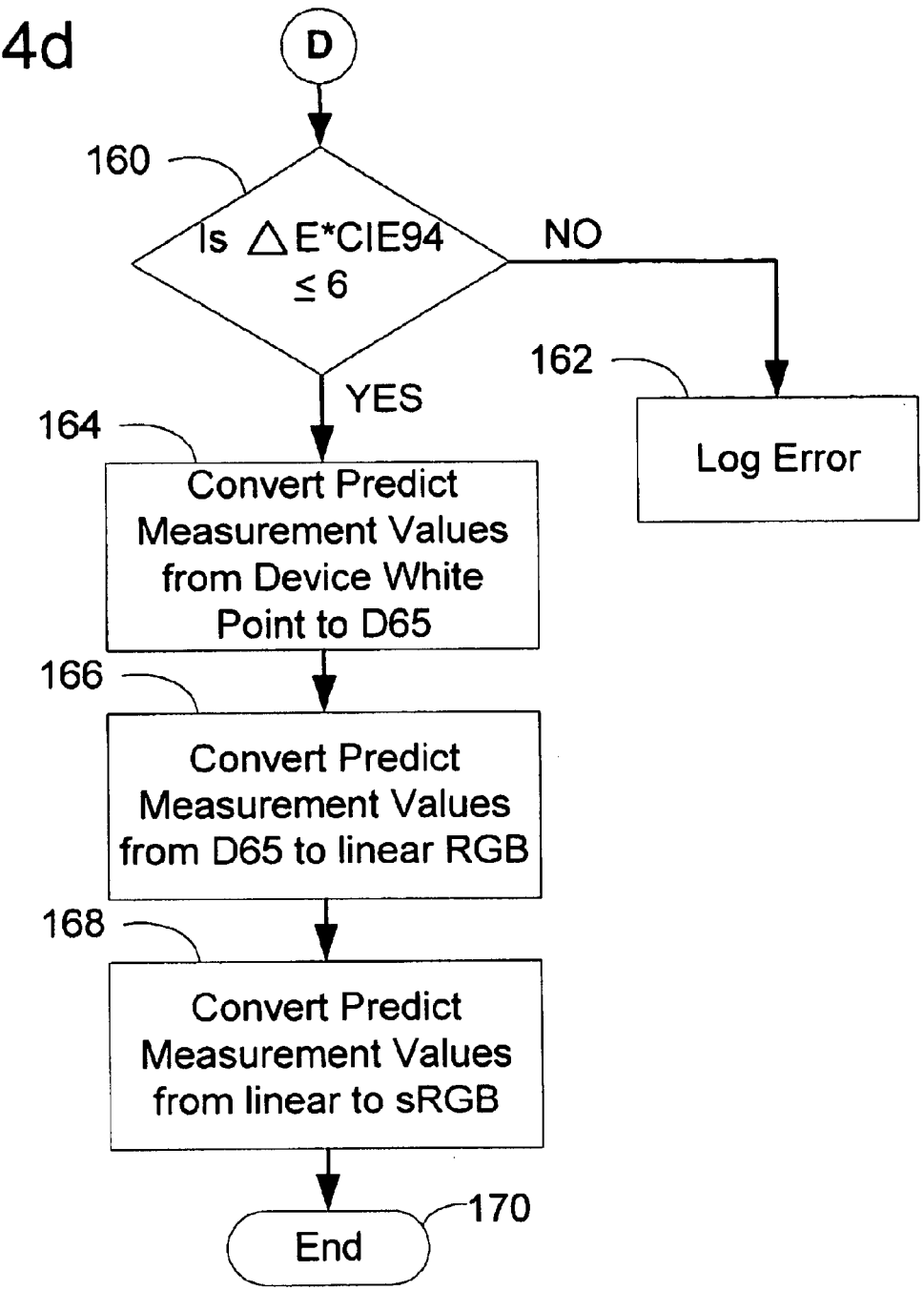

This compensation matrix may then be downloaded into fixed math or floating point firmware in the capture device hardware to allow conversion from the raw capture device image data directly to sRGB for output to the system as illustrated in FIG. 5. Specifically, the digital image capture device 172 outputs the raw RGB data 174 of the captured image, which is then normalized 176 to a range of 0–1 as follows:

$$R_{raw\text{-}norm} = \dfrac{R_{raw} - R_{raw\text{-}min}}{R_{raw\text{-}min} - R_{raw\text{-}max}}$$

$$G_{raw\text{-}norm} = \dfrac{G_{raw} - G_{raw\text{-}min}}{G_{raw\text{-}min} - G_{raw\text{-}max}}$$

$$B_{raw\text{-}norm} = \dfrac{B_{raw} - B_{raw\text{-}min}}{B_{raw\text{-}min} - B_{raw\text{-}max}}$$

This normalized RGB data 176 is then matrix multiplied by the 3×3 compensation matrix 178 calculated above in the capture device's image data compensation firmware 180 as follows:

$$\begin{bmatrix} 3\times 3 \\ Compensation \\ Matrix \end{bmatrix} \begin{bmatrix} R_{raw\text{-}norm} \\ G_{raw\text{-}norm} \\ B_{raw\text{-}norm} \end{bmatrix} = \begin{bmatrix} R' \\ G' \\ B' \end{bmatrix}$$

The output from this image data compensation 180 is then converted 182 to the device independent color space, e.g. sRGB, for output from the capture device as follows:

```
If R' < 0,
Then R_sRGB = 0,
Else  If R' < 0.00304,
    Then R_sRGB = (12.92R') · 255,
    Else  If R' > 1,
        Then R_sRGB = 255,
        Else R_sRGB = 255(1.055R'^(1/2.4) −0.055)
If G' < 0,
Then G_sRGB = 0,
Else  If G' < 0.00304,
    Then G_sRGB = (12.92G') · 255,
    Else  If G' > 1,
        Then G_sRGB = 255,
        Else G_sRGB = 255(1.055G'^(1/2.4) −0.055)
If B' < 0,
Then B_sRGB = 0,
Else  If B' < 0.00304,
    Then B_sRGB = (12.92B') · 255,
    Else  If B' > 1,
        Then B_sRGB = 255,
        Else B_sRGB = 255(1.055B'^(1/2.4) −0.055)
```

If an ICC profile is desired or required, the 3×3 matrix of expected measurement values calculated in step 116 and a simple tone curve fit of the gray scale data can be used to develop the ICC profile in a known manner.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method of calibrating a digital image capture device, comprising the steps of:
   acquiring a test target;
   determining measurement values from the test target;
   normalizing the measurement values to a range of 0 to 1;
   determining white point chromaticity for the digital image capture device;
   converting the normalized measurement values to the digital image capture device white point chromaticity;
   capturing raw color values of the test target with the digital image capture device;
   normalizing the captured raw color values to a range of 0 to 1;
   regressing the normalized measurement values with the normalized raw color values to determine a first compensation matrix; and
   verifying a level of color fidelity of the digital image capture device.

2. The method of claim 1, wherein the step of determining measurement values from the test target comprises the step of accepting published measurement values for the test target in a physical color space.

3. The method of claim 1, wherein the step of determining measurement values from the test target comprises the step of measuring the test target with calibrated test equipment in a physical color space.

4. A method of calibrating a digital image capture device, comprising the steps of:
   acquiring a test target;
   determining measurement values from the test target;
   normalizing the measurement values to a range of 0 to 1;
   determining white point chromaticity for the digital image capture device;
   converting the normalized measurement values to the digital image capture device white point chromaticity;
   capturing raw color values of the test target with the digital image capture device;
   normalizing the captured raw color values to a range of 0 to 1;
   regressing the normalized measurement values with the normalized raw color values to determine a first compensation matrix;
   verifying a level of color fidelity of the digital image capture device; and
   wherein the step of converting the normalized measurement values to the digital image capture device white point chromaticity comprises the step of using simplified Bradford white point adaptation equations to bring the normalized measurement values into the capture device color space.

5. The method of claim 1, wherein the step of capturing raw color values of the test target with the digital image capture device comprises the step of disabling any gamma correction fiction of the capture device prior to capturing raw color values of the test target.

6. The method of claim 1, wherein the step of regressing the normalized measurement values with the normalized raw color values to determine a first compensation matrix comprises the steps of assigning the normalized measurement values from the test target converted to the capture device white point as the dependent data, and assigning the normalized raw color data as the independent data.

7. A method of calibrating a digital image capture device, comprising the steps of:
   acquiring a test target;
   determining measurement values from the test target;
   normalizing the measurement values to a range of 0 to 1;
   determining white point chromaticity for the digital image capture device;
   converting the normalized measurement values to the digital image capture device white point chromaticity;
   capturing raw color values of the test target with the digital image capture device;
   normalizing the captured raw color values to a range of 0 to 1;
   regressing the normalized measurement values with the normalized raw color values to determine a first compensation matrix;
   verifying a level of color fidelity of the digital image capture device;
   forcing a y-intercept of the regression to zero; and
   wherein the step of regressing the normalized measurement values with the normalized raw color values to determine a first compensation matrix comprises the steps of assigning the normalized measurement values from the test target converted to the capture device white point as the dependent data, and assigning the normalized raw color data as the independent data.

8. The method of claim 6, wherein the step of regressing is performed on an electronic spreadsheet.

9. A method of calibrating a digital image capture device, comprising the steps of:
acquiring a test target;
determining measurement values from the test target;
normalizing the measurement values to a range of 0 to 1;
determining white point chromaticity for the digital image capture device;
converting the normalized measurement values to the digital image capture device white point chromaticity;
capturing raw color values of the test target with the digital image capture device;
normalizing the captured raw color values to a range of 0 to 1;
regressing the normalized measurement values with the normalized raw color values to determine a first compensation matrix;
verifying a level of color fidelity of the digital image capture device; and
wherein the step of verifying a level of color fidelity of the digital image capture device comprises the steps of:
matrix multiplying the first compensation matrix with the normalized raw color data to obtain predicted measurement values;
comparing the normalized test target measurement values converted to the capture device white point with the predicted measurement values to obtain the CIE 1996 color difference values, including ΔE*CIE94; and
checking ΔE*CIE94 against a predetermined threshold for acceptable color fidelity.

10. The method of claim 9, wherein the step of comparing the normalized test target measurement values converted to the capture device white point with the predicted measurement values comprises the step of converting the normalized test target measurement values converted to the capture device white point and the predicted measurement values to the CIEL*a*b* color space.

11. The method of claim 9, wherein the step of checking ΔE*CIE94 against a predetermined threshold for acceptable color fidelity reveals that ΔE*CIE94 is larger than the predetermined threshold, further comprising the step of logging an error.

12. The method of claim 9, wherein the step of checking ΔE*CIE94 against a predetermined threshold for acceptable color fidelity reveals that ΔE*CIE94 is equal to or smaller than the predetermined threshold, further comprising the steps of:
calculating a second compensation matrix for compensating raw color data from the capture device; and
downloading the second compensation matrix into the capture device.

13. The method of claim 12, wherein the step of calculating a second compensation matrix comprises the step of translating the first compensation matrix from capture device color space to a device independent color space.

14. The method of claim 1, wherein the step of acquiring a test target comprises the step of developing a customized test target for a particular application.

15. The method of claim 1, wherein the step of acquiring a test target comprises the step of acquiring a test target with at least six color patches thereon.

16. The method of claim 15, wherein said at least six color patches include a white patch, a black patch, a gray patch, and three orthogonal colors.

17. The method of claim 16, wherein the gray patch is in the range of 25% to 75% gray.

18. The method of claim 1, wherein the step of acquiring a test target comprises the step of acquiring a test target whose spectral makeup is representative of the type of material of the objects whose digital images will be captured.

19. A method of achieving high color fidelity in a digital image capture device, comprising the steps of:
capturing color data from an image;
normalizing the color data to both black and white;
compensating the normalized color data with a compensation matrix; and
wherein the step of compensating the normalized color data with a compensation matrix comprises the step of calibrating the capture device through the following steps:
acquiring a test target;
determining measurement values from the test target;
normalizing the measurement values to both black and white;
determining white point chromaticity for the digital image capture device;
converting the normalized measurement values to the digital image capture device color space;
capturing raw color values of the test target with the capture device;
normalizing the captured raw color values to both black and white; and
regressing the normalized measurement values with the normalized raw color values to determine the compensation matrix in the color space of the capture device.

20. A method of achieving high color fidelity in a digital image capture device, comprising the steps of:
capturing color data from an image;
normalizing the color data to both black and white;
compensating the normalized color data with a compensation matrix;
verifying a level of color fidelity of the digital image capture device by calculating color difference parameters between the normalized measurement values converted to the capture device color space and the normalized raw color data compensated by the compensation matrix in the capture device color space; and
wherein the step of compensating the normalized color data with a compensation matrix comprises the step of calibrating the capture device through the following steps:
acquiring a test target;
determining measurement values from the test target;
normalizing the measurement values to both black and white;
determining white point chromaticity for the digital image capture device;
converting the normalized measurement values to the digital image capture device color space;
capturing raw color values of the test target with the capture device;
normalizing the captured raw color values to both black and white; and regressing the normalizing measurement values with the normalized raw color values to determine the compensation matrix in the color space of the capture device.

* * * * *